(12) United States Patent
Furumiya et al.

(10) Patent No.: US 7,990,820 B2
(45) Date of Patent: Aug. 2, 2011

(54) OPTICAL DISC VERIFICATION METHOD AND OPTICAL DISC MEDIUM

(75) Inventors: Shigeru Furumiya, Hyogo (JP); Atsushi Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 12/369,870

(22) Filed: Feb. 12, 2009

(65) Prior Publication Data

US 2009/0207705 A1 Aug. 20, 2009

Related U.S. Application Data

(60) Provisional application No. 61/028,930, filed on Feb. 15, 2008.

(51) Int. Cl.
*G11B 5/09* (2006.01)
(52) U.S. Cl. .......... 369/47.14; 369/53.12; 369/53.2; 369/53.22; 369/53.41
(58) Field of Classification Search .......... 369/47.14, 369/53.12, 53.2, 53.22, 53.41
See application file for complete search history.

(56) References Cited

U.S. PATENT DOCUMENTS

| | | | | |
|---|---|---|---|---|
| 5,963,520 A * | 10/1999 | Kubo et al. | ............ | 369/53.28 |
| 5,982,725 A * | 11/1999 | Kubo et al. | ............ | 369/53.2 |
| 2005/0063264 A1* | 3/2005 | Miyamoto et al. | ............ | 369/47.4 |
| 2005/0169147 A1* | 8/2005 | Kobayashi et al. | ........ | 369/53.35 |
| 2008/0084803 A1* | 4/2008 | Chen et al. | ............ | 369/53.22 |
| 2009/0046550 A1 | 2/2009 | Kato et al. | | |

FOREIGN PATENT DOCUMENTS

| | | |
|---|---|---|
| EP | 0 642 122 | 3/1995 |
| JP | 05-225571 | 9/1993 |
| JP | 07-057267 | 3/1995 |
| JP | 07-073470 | 3/1995 |
| JP | 10-064063 | 3/1998 |
| JP | 10-149586 | 6/1998 |
| JP | 2005-100482 | 4/2005 |
| JP | 2006-107696 | 4/2006 |
| JP | 3873722 | 11/2006 |

OTHER PUBLICATIONS

International Search Report for corresponding application No. PCT/JP2009/000532 mailed Mar. 10, 2009.

(Continued)

*Primary Examiner* — Wayne Young
*Assistant Examiner* — Brenda Bernardi
(74) *Attorney, Agent, or Firm* — Renner, Otto, Boisselle & Sklar, LLP

(57) ABSTRACT

An optical disc verification method according to the present invention includes the steps of: writing data on first, second and third radial locations on an optical disc at a writing speed V1 and reading the data written there, thereby measuring read signal quality index values A, B and C, where the second radial location is inside of the first radial location and the third radial location is inside of the second radial location; writing data on the first and second radial locations at a writing speed V2, which is higher than V1, and reading the data written there, thereby measuring read signal quality index values D and E; and correcting the signal quality index value C with the difference between the signal quality index values B and E, thereby calculating a signal quality index value F that would be obtained if data is written on, and then read from, the third radial location at the speed V2.

8 Claims, 2 Drawing Sheets

OTHER PUBLICATIONS

Blu-ray Disc Reader (Blu-ray Handbook), published by Ohmsha, Ltd., pp. 13-28 (cited in the specification) with a concise explanation.
White paper, Blu-ray Disc Format, General, Aug. 2004, pp. 1-37 (cited in the specification).
White paper, Blu-ray Disc Format, 3. File System Specifications for BD-RE, R, ROM, Aug. 2004, pp. 1-6 (cited in the specification).
White paper, Blu-ray Disc Format, 4. Key Technologies, Aug. 2004, pp. 1-8 (cited in the specification).

* cited by examiner

OPTICAL DISC VERIFICATION METHOD AND OPTICAL DISC MEDIUM

BACKGROUND OF THE INVENTION

1. Field of the Invention

The present invention relates to an optical disc verification method and an optical disc medium that would contribute to high-speed writing.

2. Description of the Related Art

Examples of various storage media from/on which data can be read and/or written optically (which will be simply referred to herein as "optical discs") include write-once discs such as CD-Rs, DVD-Rs and BD-Rs, to which data can be just added, and rewritable discs such as DVD-RWs, DVD-RAMs, and BD-REs. A standard writing speed is defined for all of these optical discs. More specifically, the writing speed is represented as either a linear velocity or a transfer rate. In this description, the writing speed will be represented herein by the linear velocity in most cases.

Recently, in response to the demand from the market and thanks to development of technologies, the highest writing speeds on optical discs have been increasing so rapidly that a write operation can now be performed on DVD-Rs at as high a writing speed as 16×. As for BD-Rs, on the other hand, discs and recorders that realize 4× writing are already used extensively. And optical discs that will be able to get writing done at even higher speeds are also under research and development. As used herein, the "× speed", for example, means that the writing speed is  times as high as the standard writing speed.

However, the higher the maximum writing speed of an optical disc, the stricter the writing conditions should be. That is why the manufacturers and verification authorities of optical discs test a given optical disc to see if its properties meet predetermined criteria for high speed writing. For that purpose, a test write operation is actually performed on inner, middle and outer tracks of a sample optical disc to see if the signal quality index value of the read signal falls within a predetermined range. And only optical discs that have passed such a test are shipped as products.

In a situation where a high-speed write operation is performed on a normal optical disc with a thickness of 1.2 mm and a diameter of 12 cm, the optical disc is preferably used at rotational frequencies of approximately 10,000 rpm or less according to the current state of the art, in view of the maximum allowable rotational frequency of a spindle motor, the noise, and safety measures to take to avoid the rapture of the disc. Also, if an optical disc were rotated at a constant rotational frequency, the write linear velocity on an inner area with a relatively small radius would be less than the one on an outer area with a relatively large radius. For that reason, if the highest writing speed were more and more increased, then the rotational frequency would be too high on inner tracks with a relatively small radius to get the data written at desired high speeds easily. More specifically, in a BD, for example, if the writing speed is 5×, then the rotational frequency will reach approximately 9,800 rpm in the vicinity of a radial location of 24 mm. And if the writing speed is further increased to 6× or more, then the rotational frequency in the vicinity of the radial location of 24 mm will exceed 12,000 rpm.

That is why even if an optical disc has been designed and manufactured so as to meet predetermined properties for high-speed writing, it is impossible to see, by the conventional optical disc testing method, if its signal quality index value on inner tracks, where the rotational frequency of the optical disc increases significantly, falls within the predetermined range for high-speed writing.

Also, even if an optical disc apparatus for use in the testing process had a spindle motor that is powerful enough to achieve a rotational frequency exceeding 10,000 rpm, the spindle motor and the optical disc would produce such great vibrations at those high frequencies that the tracking servo would lose stability too much to get the given optical disc tested accurately. That is why in the prior art, good signal quality cannot be ensured when a high-speed write operation is performed on inner tracks on an optical disc.

For these reasons, even if a drive that could perform a high-speed write operation on inner tracks with good stability was developed, an optical disc medium, which could not ensure good signal quality when a high-speed write operation was performed on inner tracks, would still have to be used.

SUMMARY OF THE INVENTION

It is therefore an object of the present invention to provide an optical disc verification method that ensures good signal quality even when a high-speed write operation is performed on inner tracks, where it is usually difficult to get the test done successfully, and also provide an optical disc with guaranteed quality.

An optical disc verification method according to the present invention includes the steps of: writing data on first, second and third radial locations on an optical disc at a writing speed V1 and reading the data written there, thereby measuring read signal quality index values A, B and C, where the second radial location is inside of the first radial location and the third radial location is inside of the second radial location; writing data on the first and second radial locations at a writing speed V2, which is higher than V1, and reading the data written there, thereby measuring read signal quality index values D and E; and correcting the signal quality index value C with the difference between the signal quality index values B and E, thereby calculating a signal quality index value F that would be obtained if data is written on, and then read from, the third radial location at the speed V2.

In one preferred embodiment, the optical disc verification method further includes the step of seeing if the signal quality index values A, B, C, D, E and F are equal to or smaller than a predetermined value after the signal quality index value F has been calculated.

Another optical disc verification method according to the present invention includes the steps of: writing data on first, second and third radial locations on an optical disc at a writing speed V1 and reading the data written there, thereby measuring read signal quality index values A, B and C, where the second radial location is inside of the first radial location and the third radial location is inside of the second radial location; writing data on the first and second radial locations at a writing speed V2, which is higher than V1, and reading the data written there, thereby measuring read signal quality index values D and E; correcting the signal quality index value C with the difference between the signal quality index values B and E, thereby calculating a signal quality index value F that would be obtained if data is written on, and then read from, the third radial location at the speed V2 and; writing data on the first radial location at a writing speed V3, which is even higher than V2, and reading the data written there, thereby getting a read signal quality index value G; and correcting the signal quality index value E with the difference between the signal quality index values G and D, thereby calculating a signal quality index value H that would be obtained if data is written on, and then read from, the second radial location at the speed V3.

In one preferred embodiment, the optical disc verification method further includes the step of seeing if the signal quality index values A, B, C, D, E, F, G and H are equal to or smaller than a predetermined value after the signal quality index value H has been calculated.

In another preferred embodiment, the signal quality index value F is calculated by either C+E−B or $(C^2+E^2-B^2)^{0.5}$.

In still another preferred embodiment, the signal quality index value H is calculated by either E+G−D or $(E^2+G^2-D^2)^{0.5}$.

In yet another preferred embodiment, the signal quality index value is a jitter value involved with binarization.

In yet another preferred embodiment, the signal quality index value is a PRML error correlation value.

On an optical disc according to the present invention, stored in advance in a lead-in area are standard recording power and write pulse conditions for writing speeds V1 and V2, where V2 is higher than V1. And if one of the above-explained optical disc verification method is carried out on the optical disc with the standard recording power and write pulse conditions, signal quality index values at the writing speeds V1 and V2 become equal to or smaller than a predetermined value.

On another optical disc according to the present invention, stored in advance in a lead-in area are standard recording power and write pulse conditions for writing speeds V1, V2 and V3, where V3>V2>V1 is satisfied. And if one of the above-explained optical disc verification method is carried out on the optical disc medium with the standard recording power and write pulse conditions, signal quality index values at the writing speeds V1, V2 and V3 become equal to or smaller than a predetermined value.

The optical disc verification method of the present invention provides a highly reliable optical disc that ensures high signal quality even when a high-speed write operation is performed on an inner area, where it is usually difficult to get a test done successfully. Also, with the optical disc of the present invention, a broader performance margin can be left for a disc drive that can carry out read/write operation at high speeds, thus establishing an increased degree of compatibility between various drives.

DETAILED DESCRIPTION OF PREFERRED EMBODIMENTS

Figure 1:
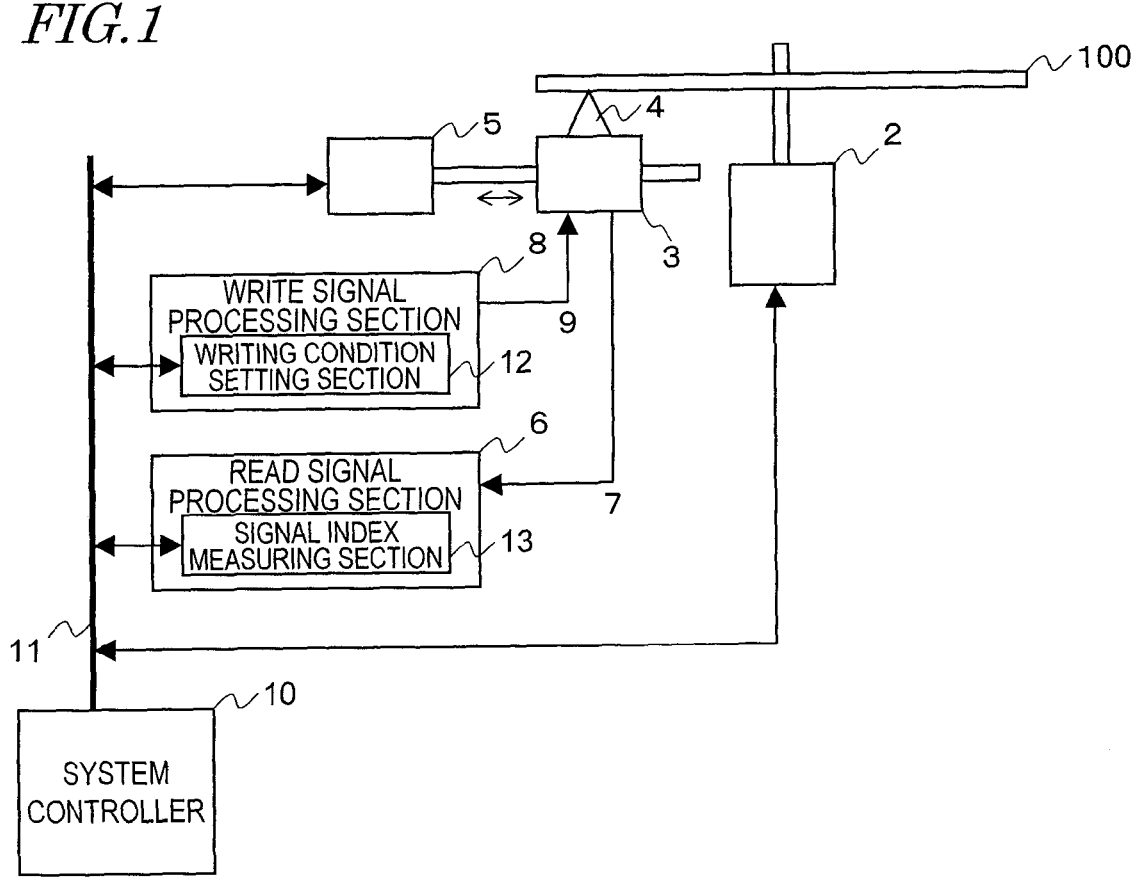
FIG. 1 is a block diagram illustrating a disc drive that carries out the optical disc verification method of the present invention.

Hereinafter, preferred embodiments of an optical disc verification method and optical disc according to the present invention will be described with reference to the accompanying drawings. FIG. 1 is a block diagram illustrating a disc drive that carries out the optical disc verification method of the present invention.

The drive shown in FIG. 1 includes a motor 2, an optical head 3, a traverse mechanism 5, a read signal processing section 6 and a write signal processing section 8. The drive further includes a system controller 10 as a control section. The system controller 10 receives various kinds of information from respective components through a control bus 11 and controls those components.

The motor 2 mounts an optical disc 100 thereon and turns the optical disc 100 at a predetermined rotational velocity in accordance with an instruction that has been issued by the system controller 10.

The optical head 3 includes a light source and irradiates the optical disc 100 with a light beam 4, which has been emitted from the light source, thereby writing data there. During reading, the optical head 3 also irradiates the optical disc 100 with the light beam 4 and detects reflected light that has been modulated by marks and spaces on the optical disc 100, thereby generating a read signal.

The traverse mechanism 5 moves the optical head 3 along the radius of the optical disc 100 so that the target track to read data from, or write data to, is irradiated with the light beam 4.

The write signal processing section 8 generates a write signal 9 for use to perform a test write operation on the optical disc 100 to be tested and outputs it to the optical head 3. In particular, the write signal processing section 8 includes a writing condition setting section 12, which defines light source driving conditions in order to generate a random signal including multiple pulses that will randomly leave marks and spaces of varying lengths compliant with the modulation rules.

The read signal processing section 6 detects the characteristics of the read signal 7 that has been supplied from the optical head 3. Specifically, the read signal processing section 6 includes a signal index measuring section 13 that evaluates the signal quality index value of the read signal 7. As the signal quality index value, an index value that directly shows the overall performance grade of the optical disc 3 is preferably used, and may be a binarization jitter value of the read random signal. Also, as for a disc drive that adopts a PRML (partial response maximum likelihood) decoding method for reading, its error correlation value is preferably used as the signal quality index value. Specifically, examples of preferred signal quality index values include MLSE (maximum likelihood sequence error) values and SAM (sequenced amplitude margin) values.

Figure 2:
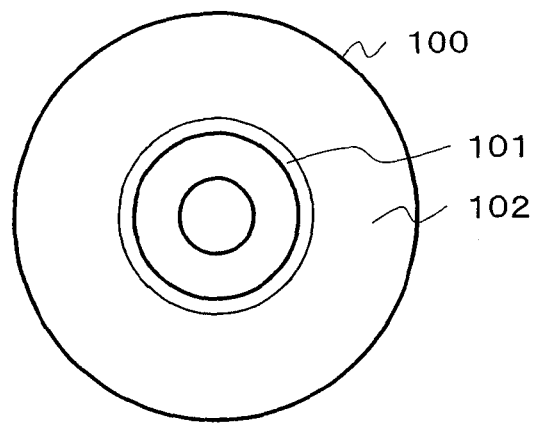
FIG. 2 schematically illustrates a track layout for an optical disc according to the present invention.

FIG. 2 illustrates a track layout for the optical disc 100 of the present invention to be tested by the optical disc verification method of the present invention. As shown in FIG. 2, the optical disc 100 has a lead-in area 101, which is arranged as the innermost area, and user data tracks 102, which are located outside of the lead-in area 101 and on which the user can write his or her desired data. That part of the optical disc 100 with the user data tracks will also be referred to herein as a "data area".

The optical disc 100 may be either a write-once disc or a rewritable one. If the optical disc 100 is a write-once disc, data that has been once written on the user data tracks 102 is no longer rewritable. Even so, data can still be added to the remaining unrecorded portion of the user data tracks 102. On the other hand, if the optical disc 100 is a rewritable one, the data that has been written on the user data tracks 102 is rewritable an unlimited number of times.

To see if a read signal with a predetermined signal quality can be obtained from the entire user data tracks 102, a test is carried out on first, second and third radial locations within the user data tracks 102 of the optical disc 100, where the second radial location is defined inside of the first radial location and the third radial location is defined inside of the second radial location. That is to say, supposing the first, second and third radial locations are identified by r1, r2, and r3, respectively, r1>r2>r3 is satisfied. For example, if the optical disc 100 has a diameter of approximately 12 cm, r1, r2 and r3 preferably satisfy 57 mm≦r1≦59 mm, 40 mm≦r2≦42 mm, and 23 mm≦r3≦25 mm, respectively, and also satisfy r2=(r1+r3)/2. More preferably, r1=58 mm, r2=41 mm, and r3=24 mm. In the following description, the first, second and third radial locations will be referred to herein as outer, middle and inner tracks, respectively.

It should be noted that the disc drive shown in FIG. 1 could be implemented as either an apparatus dedicated for testing the optical disc 100 or an optical disc drive that can not only test the optical disc 100 but also write arbitrary user data on, and read the stored data from, the optical disc 100.

Hereinafter, a preferred embodiment of an optical disc testing method according to the present invention using the disc drive shown in FIG. 1 will be described in detail. The procedure of this method may be stored, as a computer readable program (firmware), in an information storage medium (such as an EEPROM or a RAM) inside the system controller 10, which reads the program that defines that procedure and controls the respective components in accordance with the procedure.

Step 1

Get the optical head 3 moved by the traverse mechanism 5 such that the light beam 4 emitted from the optical head 3 reaches the outer track of the optical disc 100. Also, get the optical disc 100 turned by the motor 2 such that the writing speed (linear velocity) becomes V1 on the outer track of the optical disc 100.

Step 2

Write predetermined data on the outer track of the optical disc 100. More specifically, get recording power and write pulse conditions defined for the writing speed V1 by the writing condition setting section 12 of the write signal processing section 8, drive the light source of the optical head 3 under the conditions defined, and then irradiate the optical disc 100 with the light beam 4. In this manner, a number of marks and spaces with randomly varying mark and space lengths, corresponding to the random signal, are left on the outer track of the optical disc 100.

Step 3

Read the data that has been written on the outer track of the optical disc 100 and get the signal quality index value thereof. Specifically, get the optical disc 100 turned by the motor 2 so that the reading speed becomes V0 on the outer track, where the reading speed V0 is equal to or lower than the writing speed V1 (i.e., a low reference speed that satisfies V0≦V1).

Next, get a light beam 4, of which the intensity has been decreased to an appropriate level for reading, emitted from the optical head 3 so that the outer track of the optical disc 100 is irradiated with the light beam 4. And get the reflected light, which has been modulated by the marks and spaces on the optical disc 100, detected by the optical head 3, thereby generating a read signal 7. Then, the signal index measuring section 13 of the read signal processing section 6 measures the signal quality index value of the read signal 7. The index value A thus obtained may be stored in a memory in the system controller 10, for example.

Step 4

Get the optical head 3 moved again by the traverse mechanism 5 such that the light beam 4 emitted from the optical head 3 reaches the middle track on the optical disc 100. Also, get the optical disc 100 turned by the motor 2 such that the writing speed becomes V1 on the middle track on the optical disc 100.

Step 5

Follow the same procedure as in Step 2 to leave a number of marks with randomly varying mark and space lengths, corresponding to the random signal, on the middle track on the optical disc 100.

Step 6

Follow the same procedure as in Step 3 to read the data that has been written on the middle track on the optical disc 100 at the reading speed V0 and measure the signal quality index value of the read signal 7. Then, store the index value B thus obtained in the memory in the system controller 10.

Step 7

Get the optical head 3 moved again by the traverse mechanism 5 such that the light beam 4 emitted from the optical head 3 reaches the inner track on the optical disc 100. Also, get the optical disc 100 turned by the motor 2 such that the writing speed becomes V1 on the inner track on the optical disc 100.

Step 8

Follow the same procedure as in Step 2 to leave a number of marks with randomly varying mark and space lengths, corresponding to the random signal, on the inner track on the optical disc 100.

Step 9

Follow the same procedure as in Step 3 to read the data that has been written on the inner track on the optical disc 100 at the reading speed V0 and measure the signal quality index value of the read signal 7. Then, store the index value C thus obtained in the memory in the system controller 10.

Step 10

Get the optical head 3 moved again by the traverse mechanism 5 such that the light beam 4 emitted from the optical head 3 goes back to the outer track of the optical disc 100. Also, get the optical disc 100 turned by the motor 2 such that the writing speed becomes V2 on the outer track of the optical disc 100, where the writing speed V2 is defined to be higher than the writing speed V1 (i.e., V2>V1).

Step 11

Follow the same procedure as in Step 2 to leave a number of marks and spaces with randomly varying mark and space lengths, corresponding to the random signal, on the outer track of the optical disc 100.

Step 12

Follow the same procedure as in Step 3 to read the data that has been written on the outer track of the optical disc 100 at the reading speed V0 and measure the signal quality index value of the read signal 7. Then, store the index value D thus obtained in the memory in the system controller 10.

Step 13

Get the optical head 3 moved again by the traverse mechanism 5 such that the light beam 4 emitted from the optical head 3 goes back to the middle track on the optical disc 1. Also, get the optical disc 100 turned by the motor 2 such that the writing speed becomes V2 on the middle track on the optical disc 100.

Step 14

Follow the same procedure as in Step 2 to leave a number of marks with randomly varying mark and space lengths, corresponding to the random signal, on the middle track on the optical disc 100.

Step 15

Follow the same procedure as in Step 3 to read the data that has been written on the middle track on the optical disc 100 at the reading speed V0 and measure the signal quality index value of the read signal 7. Then, store the index value E thus obtained in the memory in the system controller 10.

Step 16

Get the signal quality index value C corrected by the system controller 10 with the difference between the signal quality index values B and E and define the value thus calculated as a signal quality index value that would be obtained when the random signal is written on the inner track on the optical disc 100 at the writing speed V2 and then read from it. Specifically, $E^2-B^2$ is calculated, the remainder is added to $C^2$, and then the root of the sum is calculated. That is to say, $(C^2+E^2-B^2)^{0.5}$ is calculated and the result is defined to be a signal quality index value F.

Step 17

Get the optical head 3 moved again by the traverse mechanism 5 such that the light beam 4 emitted from the optical head 3 goes back to the outer track of the optical disc 1. Also, get the optical disc 100 turned by the motor 2 such that the writing speed becomes V3 on the outer track of the optical disc 100, where the writing speed V3 is defined to be higher than the writing speed V2 (i.e., V3>V2).

Step 18

Follow the same procedure as in Step 2 to leave a number of marks with randomly varying mark and space lengths, corresponding to the random signal, on the outer track of the optical disc 100.

Step 19

Follow the same procedure as in Step 3 to read the data that has been written on the outer track of the optical disc 100 at the reading speed V0 and measure the signal quality index value of the read signal 7. Then, store the index value G thus obtained in the memory in the system controller 10.

Step 20

Get the signal quality index value E corrected by the system controller 10 with the difference between the signal quality index values G and D and define the value thus calculated as a signal quality index value that would be obtained when the random signal is written on the middle track on the optical disc 100 at the writing speed V3 and then read from it. Specifically, $G^2-D^2$ is calculated, the remainder is added to $E^2$, and then the root of the sum is calculated. That is to say, $(E^2+G^2-D^2)^{0.5}$ is calculated and the result is defined to be a signal quality index value H.

Step 21

Get the signal quality index value C corrected by the system controller 10 with the difference between the signal quality index values G and A and define the value thus calculated as a signal quality index value that would be obtained when the random signal is written on the inner track on the optical disc 100 at the writing speed V3 and then read from it. Specifically, $G^2-A^2$ is calculated, the remainder is added to $C^2$, and then the root of the sum is calculated. That is to say, $(C^2+G^2-A^2)^{0.5}$ is calculated and the result is defined to be a signal quality index value I.

Step 22

Get the signal quality index values A, B, C, D, E and G measured and the signal quality index values F, H and I calculated compared to a predetermined value by the system controller 10 to determine whether or not the optical disc 100 is compliant with a predetermined signal quality index standard. Specifically, if all of these signal quality index values A, B, C, D, E, F, G, H and I are equal to or smaller than the predetermined value, then the system controller 10 outputs a signal, indicating that the optical disc 100 will achieve the expected signal quality if the writing speed is equal to or lower than V3, to an external device. Alternatively, the system controller 10 may also display a message, indicating that the optical disc 100 will achieve the expected signal quality if the writing speed is equal to or lower than V3, on a display device (not shown) provided for the disc drive shown in FIG. 1.

It should be noted that these processing steps 1 through 22 do not always have to be carried out in this order but could be performed in a different order as long as the read/write signal quality index values, required for testing, could be obtained. For example, the processing step 16 may be performed after the processing steps 18 and 19.

Hereinafter, a preferred specific example of the present invention will be described. In the following example, a BD-R is used as the optical disc 100.

Main optical constants and physical formats for BDs are disclosed in "Blu-ray Disc Reader" (published by Ohmsha, Ltd.) and on White Paper at the website of the Blu-ray Disc Association (http://www.blue-raydisc.com), for example. Specifically, the standard linear velocity (which will also be referred to herein as "reference linear velocity" or 1×) corresponding to a standard BD transfer rate (1×) is 4.9 m/sec. The 2×, 4×, 6×, 8× and 10× linear velocities are 9.8 m/sec, 19.7 m/sec, 29.5 m/sec, 39.3 m/sec and 49 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined. Consequently, writing speeds may be defined as 2×, 4× and so on, but could also be defined as 0.5×, 4.5× and so on.

In this preferred embodiment, three locations defined by radii of approximately 24 mm, approximately 41 mm and approximately 58 mm are used as the inner, middle and outer tracks, respectively. Also, the writing speeds V1, V2 and V3 are respectively supposed to be 4×, 6× and 10× speeds for BDs. By performing a write operation on these radial locations at the speeds V1, V2 and V3, respectively, the signal quality index values A through I can be obtained. The following Table 1 summarizes the signal quality index values and rotational velocities for the respective combinations of radial locations and writing speeds. In Table 1, for each of the signal quality index values A through I, the specific location on the optical disc 100 where that signal quality index value A through I was calculated and its associated writing speed are shown in parentheses beside that index value for the sake of clarity. The same notation will be used in the rest of the drawings and tables.

TABLE 1

| Radial location/ Writing speed | | Inner track 24 mm | Middle track 41 mm | Outer track 58 mm |
|---|---|---|---|---|
| V1 | 4× | C (inner, V1) 7,826 rpm | B (middle, V1) 4,581 rpm | A (outer, V1) 3,238 rpm |
| V2 | 6× | F (inner, V2) 11,738 rpm | E (middle, V2) 6,871 rpm | D (outer, V2) 4,857 rpm |
| V3 | 10× | I (inner, V3) 19,564 rpm | H (middle, V3) 11,452 rpm | G (outer, V3) 8,096 rpm |

If the optical disc is tested at 4× writing speed following the procedure described above, then the rotational velocity will not exceed 10,000 rpm at any of the three radial locations. As a result, the signal quality index values A, B and C can be actually measured on all of the outer, middle and inner tracks. On the other hand, if the optical disc were tested either at 6× writing speed on the inner track or at 10× writing speed on the middle or inner track, then the rotational velocity would exceed 10,000 rpm, and it should be difficult to measure the signal quality index values.

Figure 3:
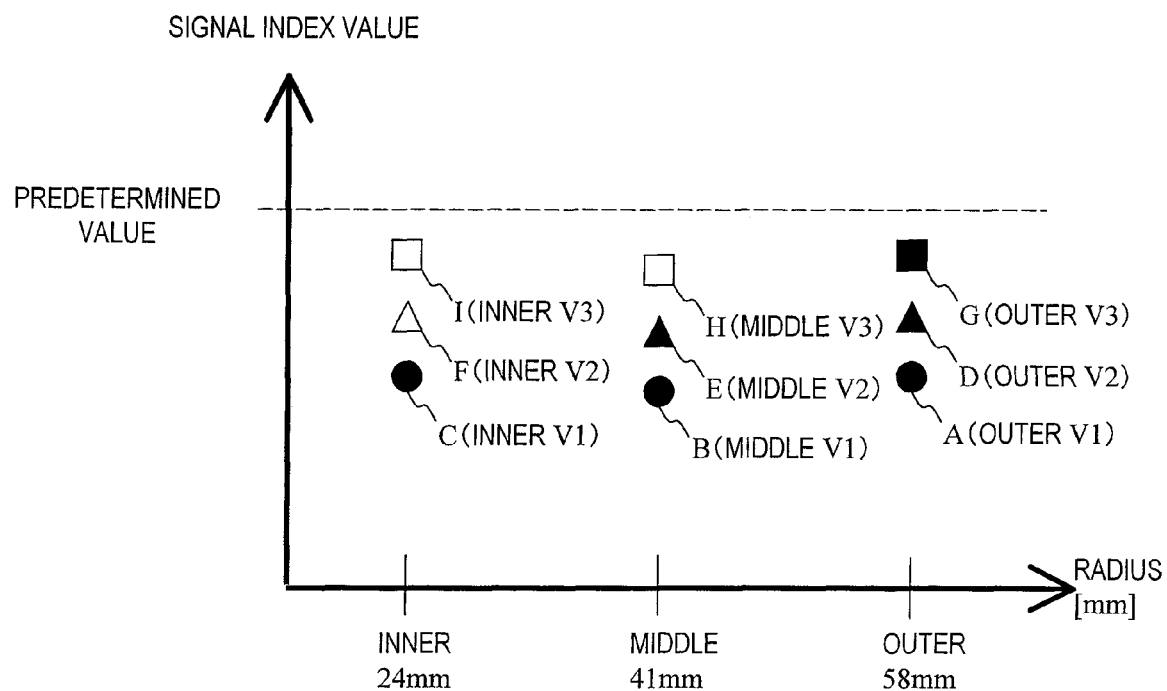
FIG. 3 schematically shows relations between the signal quality index values measured and calculated by the optical disc verification method of the present invention and radial locations.

According to the present invention, however, such signal quality index values that would be difficult to measure actually can also be obtained by calculations. FIG. 3 schematically shows relations between the signal quality index values actually measured, the ones calculated, and radial locations. In FIG. 3, the abscissa represents the radial location, while the ordinate represents the signal quality index value. Also, the circles, triangles, and squares represent the signal quality index values at V1 (4×), V2 (6×) and V3 (10×) writing speeds, respectively. Specifically, the open triangles and squares indicate that those values were calculated, not measured, while the solid circles, triangles and squares indicate that those values were actually measured.

As can be seen from FIG. 3, at writing speeds and radial locations at or on which the measurement could be made, the signal quality index values were actually measured. On the other hand, at the inner radial location where the rotational velocity exceeded 10,000 rpm to make it difficult to carry out the measurements, the signal quality index values were calculated. As a result, the signal quality index values can be either measured or calculated at every writing speed and on every radial location and can be compared to a predetermined value. More specifically, the optical disc is tested for the items specified on the following Table 2 to determine whether the disc is a GO or a NO-GO:

TABLE 2

| Test items | Radius for measurement | Should be | Gotten by | Value | Decision |
|---|---|---|---|---|---|
| 4× write | 24 mm | ≦7% | Actually measured | C(inner V1) | ○/X |
| 1× read | 41 mm | | | B(middle V1) | ○/X |
| jitter | 58 mm | | | A(outer V1) | ○/X |
| 6× write | 24 mm | ≦7% | Calculated | F(inner V2) | ○/X |
| 1× read | 41 mm | | Actually measured | E(middle V2) | ○/X |
| Jitter | 58 mm | | | D(outer V2) | ○/X |
| 10× write | 24 mm | ≦7% | Calculated | I(inner V3) | ○/X |
| 1× read | 41 mm | | | H(middle V3) | ○/X |
| jitter | 58 mm | | Actually measured | G(outer V3) | ○/X |

As shown in Table 2, using the binarization jitter values of the read random signal as the signal quality index values, the jitter values may be measured at 4×, 6× and 10× writing speeds, for example. To ensure approximately the same degree of signal quality at each writing speed and on each radial location, the same predetermined value is used. For example, if the jitter value is 7% or less, then it is determined that the predetermined signal quality would be achieved.

In Table 2, the open circle ○ indicates that the signal quality index value is equal to or smaller than a predetermined value, while the cross x indicates that the signal quality index value is greater than the predetermined value. As described above, even on such a radial location or at such a writing speed on/at which the rotational velocity is too high to be lower than 10,000 rpm and to measure the signal quality index value actually, it can still be determined, by using signal quality index values calculated, whether or not the signal quality of the optical disc would be good enough even in the inner tracks, where it is usually difficult to get a test done successfully, to use it for high-speed writing.

As shown in Table 2, the signal quality index value on the inner track at 6× writing speed was obtained by calculations. However, as already described for the processing step 16, the signal quality index value F is obtained by correcting the signal quality index value C that has been actually measured. The signal quality of the optical disc 100 depends on the physical structure of its area where the measurements have been carried out. That is why even if the signal quality index value cannot be measured on the inner track at 6× writing speed, the signal quality index value F, calculated based on the signal quality index value C that has been actually measured on the inner track at 4× writing speed, should be close enough to the real signal quality index value that would be obtained by making actual measurements. The same can be said about the signal quality index values H and I at 10× writing speed. Consequently, it is meaningful to evaluate the property of the optical disc 100 using those signal quality index values F, H and I that have been calculated.

If the user uses an optical disc that has passed the optical disc test of the present invention in this manner, the real performance of that optical disc is preferably as high as what is expected to be achieved according to the result of the optical disc test. That is why the optical disc 100 of the present invention stores the writing conditions that have been used for the test, including recording powers and write pulse conditions for respective writing speeds, in advance in the lead-in area 101 shown in FIG. 2 as standard writing conditions for optical discs. The lead-in area 101 is arranged in a read-only area on the inner portion of the optical disc where data is stored as wobbled track grooves or pits. Specific examples of those recording powers and write pulse conditions for respective writing speeds that may be stored in the lead-in area 101 are shown in the following Table 3:

TABLE 3

| Byte No. | Description | | 4x conditions | 6x conditions | 10x conditions |
|---|---|---|---|---|---|
| 1 | Header | Layer # | L0 | L0 | L0 |
| 2 | | Condition set serial number | I | J | K |
| ... | | ... | | | |
| L | | Writing speed | 4 | 6 | 10 |
| ... | | ... | | | |
| M | Recording power | Reference power | 14 | 18 | 22 |
| M + 1 | | $1^{st}$ power coefficient | 0.7 | 0.7 | 0.7 |
| M + 2 | | $2^{nd}$ power coefficient | 0.3 | 0.3 | 0.3 |
| M + 3 | | $3^{rd}$ power coefficient | 0.01 | 0.01 | 0.01 |
| ... | | ... | | | |
| N | Pulse | $1^{st}$ pulse width | 17 | 18 | 20 |
| N + 1 | | $1^{st}$ pulse start point | 0 | 0 | 0 |
| N + 2 | | Latter pulse end point | ... | ... | ... |
| N + 3 | | Last pulse width | ... | ... | ... |
| ... | | ... | | | |
| ... | Footer | Manufacturer | ... | ... | ... |
| End | | Disc product code | ... | ... | ... |

For example, standard recording power and write pulse conditions for respective writing speeds V1, V2 and V3 that satisfy V3>V2>V1 may be assigned to approximately 100 bytes of information, which are used as a header through a footer, about respective condition sets with serial numbers. Specifically, this Table 3 shows a set of 4× conditions for condition set serial number I, a set of 6× conditions for condition set serial number J and a set of 10× conditions for condition set serial number K.

When loaded with the optical disc 100, the disc drive used by the user moves the optical head to the lead-in area 101, retrieves those recording power and write pulse conditions, which are stored as DI (disc information) in the lead-in area 101, and installs those conditions in itself. If data is written on the optical disc 100 at the respective writing speeds using those conditions, the write operation is performed under the same conditions as the ones that have been used to test the optical disc 100. That is why the signal quality to be achieved by reading the data written there would be as good as the one that was achieved while the optical disc 100 was tested. In other words, once the optical disc 100 is tested, the signal quality index value should always be equal to or smaller than a predetermined value. By using such an optical disc 100, good performance can be ensured with more certainty.

Consequently, the present invention can provide the market with highly reliable optical discs that would achieve good enough signal quality for high speed writing even in the inner area where it is usually difficult to get a test done successfully. On top of that, when the optical disc is loaded into a disc drive for use, the required writing conditions that have been stored in the lead-in area thereof are automatically installed into the drive. As a result, the performance of the discs that has been verified by the manufacturer or verification authorities can also be fully achieved on the market and an increased degree of compatibility can be established between various disc drives, too.

In the preferred embodiments described above, the writing speeds V1, V2 and V3 are supposed to be BD 4×, 6× and 10×, respectively. However, if the maximum allowable rotational frequency of discs were 12,000 rpm, for example, then the writing speeds V1, V2 and V3 could also be BD 6×, 8× (or 10×) and 12× (or 14×), respectively. The relations between the respective signal quality index values and the writing speeds in those situations are shown in the following Table 4:

TABLE 4

| Test items | Radius for measurement | Should be | Gotten by | Value | Decision |
|---|---|---|---|---|---|
| 6× write jitter | 24 mm | ≦7% | Actually measured | C(inner V1) | ○/X |
| 1× read | 41 mm | | | B(middle V1) | ○/X |
| | 58 mm | | | A(outer V1) | ○/X |
| 8× (or 10×) write | 24 mm | ≦7% | Calculated | F(inner V2) | ○/X |
| 1× read | 41 mm | | Actually measured | E(middle V2) | ○/X |
| Jitter | 58 mm | | | D(outer V2) | ○/X |
| 12× (or 14×) write | 24 mm | ≦7% | Calculated | I(inner V3) | ○/X |
| 1× read jitter | 41 mm | | | H(middle V3) | ○/X |
| | 58 mm | | Actually measured | G(outer V3) | ○/X |

If the given optical disc is tested at 6× writing speed, the signal quality index values can be measured on each of the inner, middle and outer tracks. If the write operation is performed on the inner track at 8× or 10× writing speed or on the middle or inner track at 12× or 14× writing speed, the rotational velocity exceeds 12,000 rpm. According to the present invention, however, the signal quality index values can be obtained by calculations in each of those situations and a good performance can be ensured for the optical disc by testing the disc for the items shown in Table 4.

In the preferred embodiments described above, the quantity of noise energy with respect to the window width is handled as the signal index value, and therefore, the signal quality index value is supposed to be obtained by adding and subtracting the squares. However, practically good effects can also be achieved even by making simple additions and subtractions. In that case, the signal quality index value F may be obtained in the processing step 16 by F=C+E−B, the signal quality index value H may be obtained in the processing step 20 by H=E+G−D, and the signal quality index value I may be obtained in the processing step 21 by I=C+G−A.

Also, in the preferred embodiments described above, the signal quality index value I is supposed to be obtained by calculations in the processing step 21 and then it is determined in the next processing step 22 whether or not the signal quality index value I is equal to or smaller than a predetermined value. However, in that case, the velocity will be extremely high in the inner area and those conditions are just theoretical ones and should not be actually usable in practice. Therefore, the optical disc does not have to be tested for that signal quality index value I.

Furthermore, in the preferred embodiments described above, good enough signal quality is supposed to be ensured by using the same predetermined value (of 7%, for example) for all of the signal quality index values that have been either measured or calculated at mutually different writing speeds or on respectively different radial locations. This measure is taken in order to ensure approximately the same signal quality, no matter how high the writing speed adopted is and where on the user data tracks the write operation is performed on the optical disc 100. However, depending on the specifications that the optical disc 100 should meet, the predetermined value may also be varied according to the writing speed and/or the radial location for measurement.

Furthermore, in the preferred embodiments described above, it is the system controller of the disc drive that determines, by comparing a signal quality index value to a predetermined value, whether or not the signal quality index value is equal to or smaller than the predetermined value. However, the operator of the disc drive may also see if the signal quality index value measured or calculated is equal to or smaller than the predetermined value.

The optical disc verification method and optical disc of the present invention contribute greatly to getting high-speed reading and writing done on optical discs, and can also be used effectively in disc drives that should perform read and write operations at high speeds.

What is claimed is:

1. An optical disc verification method comprising the steps of:
    writing data on first, second and third radial locations on an optical disc at a writing speed V1 and reading the data written there, thereby measuring read signal quality index values A, B and C, where the second radial location is inside of the first radial location and the third radial location is inside of the second radial location;
    writing data on the first and second radial locations at a writing speed V2, which is higher than V1, and reading the data written there, thereby measuring read signal quality index values D and E; and
    correcting the signal quality index value C with the difference between the signal quality index values B and E, thereby calculating a signal quality index value F that would be obtained if data is written on, and then read from, the third radial location at the speed V2.

2. The optical disc verification method of claim 1, further comprising the step of seeing if the signal quality index values A, B, C, D, E and F are equal to or smaller than a predetermined value after the signal quality index value F has been calculated.

3. An optical disc verification method comprising the steps of:
    writing data on first, second and third radial locations on an optical disc at a writing speed V1 and reading the data written there, thereby measuring read signal quality index values A, B and C, where the second radial location is inside of the first radial location and the third radial location is inside of the second radial location;
    writing data on the first and second radial locations at a writing speed V2, which is higher than V1, and reading the data written there, thereby measuring read signal quality index values D and E;
    correcting the signal quality index value C with the difference between the signal quality index values B and E, thereby calculating a signal quality index value F that would be obtained if data is written on, and then read from, the third radial location at the speed V2 and;
    writing data on the first radial location at a writing speed V3, which is even higher than V2, and reading the data written there, thereby getting a read signal quality index value G; and
    correcting the signal quality index value E with the difference between the signal quality index values G and D, thereby calculating a signal quality index value H that would be obtained if data is written on, and then read from, the second radial location at the speed V3.

4. The optical disc verification method of claim 3, further comprising the step of seeing if the signal quality index values A, B, C, D, E, F, G and H are equal to or smaller than a predetermined value after the signal quality index value H has been calculated.

5. The optical disc verification method of claim 1, wherein the signal quality index value F is calculated by either $C+E-B$ or $(C^2+E^2-B^2)^{0.5}$.

6. The optical disc verification method of claim 3, wherein the signal quality index value H is calculated by either $E+G-D$ or $(E^2+G^2-D^2)^{0.5}$.

7. The optical disc verification method of claim 1, wherein the signal quality index value is a jitter value involved with binarization.

8. The optical disc verification method of claim 1, wherein the signal quality index value is a PRML error correlation value.

* * * * *